(12) United States Patent
Huang et al.

(10) Patent No.: US 10,715,985 B2
(45) Date of Patent: *Jul. 14, 2020

(54) BLUETOOTH AUDIO COMMUNICATION SYSTEM AND METHOD FOR ACKNOWLEDGING RECEPTION OF PACKETS OF AUDIO STREAMS AT A SLAVE AND MASTER DEVICES

(71) Applicant: Audiowise Technology Inc., Hsinchu County (TW)

(72) Inventors: Kuang-Hu Huang, Hsin-Chu (TW); Wei-Chung Peng, Hsin-Chu (TW); Jeng-Hong Chen, Sunnyvale, CA (US); Pete Hsinhsiang Liu, Sunnyvale, CA (US); De-Hao Tseng, Hsin-Chu (TW); Jing-Syuan Jia, Hsin-Chu (TW); Chih-Wei Sung, Hsin-Chu (TW); I-Ken Ho, Hsin-Chu (TW)

(73) Assignee: Audiowise Technology Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,009

(22) Filed: Jan. 17, 2019

(65) Prior Publication Data
US 2019/0159002 A1 May 23, 2019

Related U.S. Application Data

(63) Continuation of application No. 15/808,853, filed on Nov. 9, 2017, now Pat. No. 10,212,569.

(51) Int. Cl.
*H04W 4/80* (2018.01)
*H04L 1/22* (2006.01)
*H04W 88/16* (2009.01)

(52) U.S. Cl.
CPC .............. *H04W 4/80* (2018.02); *H04L 1/22* (2013.01); *H04W 88/16* (2013.01)

(58) Field of Classification Search
CPC .............. H04L 1/16; H04L 2001/0092; H04L 2001/0097; H04R 2420/07
See application file for complete search history.

(56) References Cited

U.S. PATENT DOCUMENTS 8,010,047 B2 * 8/2011 Terashima .............. H04B 1/40
381/124
8,768,252 B2 7/2014 Watson
(Continued)

FOREIGN PATENT DOCUMENTS

CN 108260056 A 7/2018
WO 2016/003064 A1 1/2016

OTHER PUBLICATIONS

Sung et al., Title of Invention: Wireless Stereo Bluetooth Communication Mechanism Capable of Effectively Reducing Number of Audio Packet Retransmission, U.S. Appl. No. 16/034,370, filed Jul. 13, 2018.

*Primary Examiner* — Devan A Sandiford
(74) *Attorney, Agent, or Firm* — Winston Hsu

(57) ABSTRACT

A method applied to a wireless Bluetooth audio communication system includes: providing an audio gateway of a first piconet to communicate with a master device in the first piconet and to transmit at least one packet of audio stream to the master device and a slave device; employing a first transceiver as the master device to receive the at least one packet of the audio stream from the audio gateway; and, employing a second transceiver as the slave device to receive the at least one packet of the audio stream from the audio gateway and to acknowledge the first transceiver whether the second transceiver has successfully received the (Continued)

at least one packet of the audio stream from the audio gateway.

10 Claims, 2 Drawing Sheets

(56) References Cited

U.S. PATENT DOCUMENTS

| | | | |
|---|---|---|---|
| 9,020,437 B2* | 4/2015 | Watson | H04R 5/02 455/41.2 |
| 9,621,987 B2* | 4/2017 | Watson | H04R 5/02 |
| 9,712,186 B1* | 7/2017 | Schulz | H04L 1/1829 |
| 9,788,117 B2 | 10/2017 | Watson | |
| 10,178,711 B2* | 1/2019 | Li | H04W 88/04 |
| 10,206,039 B1* | 2/2019 | Yun | G06F 3/165 |
| 10,212,569 B1* | 2/2019 | Huang | H04L 1/22 |
| 10,244,307 B1* | 3/2019 | Tong | H04W 76/10 |
| 2005/0270565 A1* | 12/2005 | Shima | H04N 1/00915 358/1.15 |
| 2006/0194600 A1* | 8/2006 | Palin | H04W 16/14 455/512 |
| 2006/0205401 A1* | 9/2006 | Palin | H04M 1/2535 455/425 |
| 2007/0036247 A1* | 2/2007 | Capretta | H04L 27/22 375/343 |
| 2009/0238375 A1 | 9/2009 | Pilati | |
| 2010/0188212 A1 | 7/2010 | Jochelson | |
| 2011/0059696 A1* | 3/2011 | Rasmussen | H04R 25/552 455/41.1 |
| 2011/0129048 A1* | 6/2011 | Barbe | H04J 3/0658 375/371 |
| 2014/0137199 A1* | 5/2014 | Hefetz | G06Q 20/32 726/3 |
| 2015/0350814 A1* | 12/2015 | Krochmal | H04W 4/80 455/41.2 |
| 2017/0134227 A1* | 5/2017 | Song | H04W 52/0216 |
| 2017/0251469 A1* | 8/2017 | Lee | H04L 1/16 |
| 2018/0091965 A1* | 3/2018 | Watson | H04W 4/80 |
| 2018/0184234 A1* | 6/2018 | Chen | H04W 76/14 |
| 2018/0317126 A1* | 11/2018 | Wang | H04W 4/80 |
| 2018/0352558 A1* | 12/2018 | Paycher | H04W 72/1205 |
| 2019/0037312 A1* | 1/2019 | Watson | H04R 5/02 |
| 2019/0104424 A1* | 4/2019 | Hariharan | H04L 43/0847 |
| 2019/0141502 A1* | 5/2019 | Sung | H04R 1/1091 |

* cited by examiner

BLUETOOTH AUDIO COMMUNICATION SYSTEM AND METHOD FOR ACKNOWLEDGING RECEPTION OF PACKETS OF AUDIO STREAMS AT A SLAVE AND MASTER DEVICES

CROSS REFERENCE TO RELATED APPLICATIONS

This continuation application claims the benefit of U.S. application Ser. No. 15/808,853, filed on Nov. 9, 2017, which is entirely incorporated herein by reference.

BACKGROUND OF THE INVENTION

1. Field of the Invention

The invention relates to a wireless audio communication mechanism, and more particularly to a wireless Bluetooth audio communication system, corresponding transceivers, and a corresponding method.

2. Description of the Prior Art

Generally speaking, in a conventional Bluetooth audio communication system, for example, two transceivers running Bluetooth communication protocol may be used as headsets or headphones for a user wherein one transceiver is used as a master device and the other transceiver is used as a slave device. The master device of conventional Bluetooth audio communication system is arranged to relay packets of audio stream transmitted from an audio gateway of such system to the slave device so that the two transceivers can play the audio stream for the user. Due to this, the master device of conventional Bluetooth audio communication system necessarily consumes more power than the slave device. In addition, unfortunately the timings that the master device and slave device receive the same audio packet may be different, and thus the master device and slave device may play the audio stream asynchronously. The audio quality heard by the user will be worse.

SUMMARY OF THE INVENTION

Therefore one of the objectives of the invention is to provide a wireless Bluetooth audio communication system, corresponding transceivers, and a corresponding method, to solve the above-mentioned problems.

According to embodiments of the invention, a wireless Bluetooth audio communication system is disclosed. The wireless Bluetooth audio communication system comprises an audio gateway of a first piconet, a first transceiver, and a second transceiver. The audio gateway of the first piconet is configured to communicate with a master device in the first piconet and to transmit at least one packet of audio stream to the master device and a slave device. The first transceiver is used as the master device, and is configured to receive the at least one packet of the audio stream. The second transceiver is used as the slave device, and is configured to receive the at least one packet of the audio stream transmitted from the audio gateway and configured to acknowledge the first transceiver whether the second transceiver has successfully received the at least one packet of the audio stream.

According to the embodiments, a transceiver of a wireless Bluetooth audio communication system in which an audio gateway of a first piconet is arranged to communicate with a master device in the first piconet and to transmit at least one packet of audio stream to the master device and a slave device is disclosed. The transceiver is used as the master device and comprises a communication circuit and a processing circuit. The communication circuit is configured to receive the at least one packet of the audio stream from the audio gateway. The processing circuit is coupled to the communication circuit and is configured to control the communication circuit to acknowledge the audio gateway whether the transceiver has successfully received the at least one packet of the audio stream and the slave device has successfully received the at least one packet of the audio stream from the audio gateway.

According to the embodiments, a transceiver of a wireless Bluetooth audio communication system in which an audio gateway of a first piconet is arranged to communicate with a master device in the first piconet and to transmit at least one packet of audio stream to the master device and a slave device is disclosed. The transceiver is used as the slave device and comprises a communication circuit and a processing circuit. The communication circuit is configured to receive the at least one packet of the audio stream from the audio gateway. The processing circuit is coupled to the communication circuit and is configured to control the communication circuit to acknowledge the master device whether the second transceiver has successfully received the at least one packet of the audio stream from the audio gateway.

According to the embodiments, a method applied to a wireless Bluetooth audio communication system is disclosed. The method comprises: providing an audio gateway of a first piconet to communicate with a master device in the first piconet and to transmit at least one packet of audio stream to the master device and a slave device; employing a first transceiver as the master device to receive the at least one packet of the audio stream from the audio gateway; and, employing a second transceiver as the slave device to receive the at least one packet of the audio stream from the audio gateway and to acknowledge the first transceiver whether the second transceiver has successfully received the at least one packet of the audio stream from the audio gateway.

According to the embodiments, a method applied to a transceiver of a wireless Bluetooth audio communication system in which an audio gateway of a first piconet is arranged to communicate with a master device in the first piconet and to transmit at least one packet of audio stream to the master device and a slave device is disclosed. The transceiver is used as the master device. The method comprises: receiving the at least one packet of the audio stream; and acknowledging to the audio gateway whether the transceiver has successfully received the at least one packet of the audio stream and the at least one packet of the audio stream is received by the slave device.

According to the embodiments, a method applied to a transceiver of a wireless Bluetooth audio communication system in which an audio gateway of a first piconet is arranged to communicate with a master device in the first piconet and to transmit at least one packet of audio stream to the master device and a slave device is disclosed. The transceiver is used as the slave device. The method comprises: receiving the at least one packet of the audio stream; and acknowledging to the master device whether the transceiver has successfully received the at least one packet of the audio stream transmitted from the audio gateway.

These and other objectives of the present invention will no doubt become obvious to those of ordinary skill in the art after reading the following detailed description of the preferred embodiment that is illustrated in the various figures and drawings.

DETAILED DESCRIPTION

The invention is to provide a novel wireless communication system running Bluetooth compliant audio communication protocol, to provide Bluetooth compliant traffic control to maximize radio spectrum usage efficiency in true wireless stereo application. In the system, a transceiver used as a slave device is to sniff/monitor/receive packet(s) such as packet(s) of audio stream wirelessly transmitted from a gateway such as audio gateway and to acknowledge a different transceiver used as a master device whether the slave device successfully receives the packet (s) of audio stream. The master device is arranged to acknowledge the gateway whether the packet(s) is/are successfully received by both of the master device and slave device. Compared to the conventional Bluetooth audio transmission scheme, it is not necessary for the master device to relay packets of the gateway to the slave device, and the power consumption of master device and slave device can be balanced. In addition, the timings of packet reception of master device and slave device can be synchronized in the same time slots. Thus, if the transceivers of the invention are used as headphones for a user, the audio quality can be improved significantly compared to the conventional Bluetooth audio transmission scheme.

Figure 1:
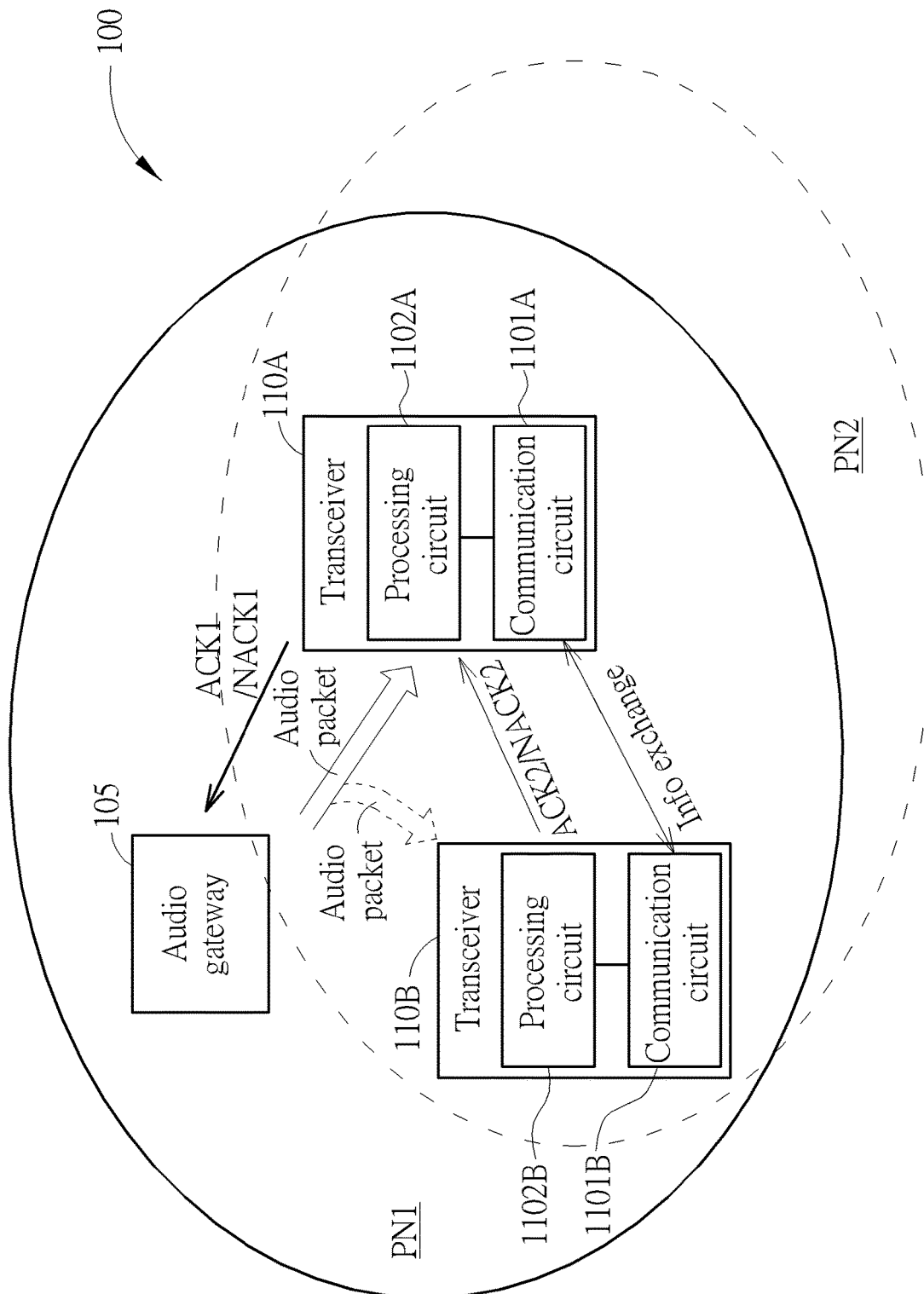
FIG. 1 is a block diagram of a wireless Bluetooth audio communication system according to embodiments of the invention.

Refer to FIG. 1. FIG. 1 is a block diagram of a wireless Bluetooth audio communication system 100 according to embodiments of the invention. As shown in FIG. 1, the communication system 100 comprises an audio gateway 105 of a first piconet PN1, a first transceiver 110A, and a second transceiver 110B. The audio gateway 105 for example is a mobile phone device or smart phone device (but not limited). The transceivers 110A and 110B are for example headsets, headphones, or wireless speakers (but not limited) which can receive wireless packet(s) of audio stream. In practice, the first transceiver 110A comprises a communication circuit 1101A and a processing circuit 1102B, and the second transceiver 110B comprises a communication circuit 1101B and a processing circuit 1102B. The communication circuits 1101A and 1101B are arranged to receive packet(s) of audio stream, respectively, and can be arrange to communicate with each other. The processing circuits 1102A and 1102B are used for controlling the communication circuits 1101A and 1101B, respectively.

A piconet for example is defined as an ad hoc network that links a wireless user group of devices using Bluetooth technology protocols. The audio gateway 105 and a master device can communicate with each other directly in the first piconet PN1, and a slave device does not communicate with audio gateway 105 directly in the first piconet PN1. For example, the master device can send an acknowledgement signal back to the audio gateway 105 to notify the audio gateway 105 of successfully receiving a packet of audio stream from audio gateway 105. A slave device does not notify the audio gateway 105 by directly sending an acknowledgement signal to audio gateway 105.

In the embodiments, the audio gateway 105 is arranged to communicate with the master device in the first piconet PN1 and to transmit packet (s) of audio stream to the master device and the slave device. For instance, the first transceiver 110A is used as the above-mentioned master device, and the communication circuit 1101A is configured to receive the packet(s) of audio stream.

In a first embodiment, the processing circuit 1102A is arranged control the communication circuit 1101A to send a first acknowledgement signal ACK1 to the audio gateway 105 when determines that the communication circuit 1101A has successfully received an packet of audio stream and also has successfully received a second acknowledgement signal ACK2 sent from the slave device. The second transceiver 110B is used as the above-mentioned slave device, and its communication circuit 1101B is configured to receive the packet of audio stream. The processing circuit 1102B of slave device 110B can control the communication circuit 1101B to send the second acknowledgement signal ACK2 to the master device 110A when determining that the communication circuit 1102B of slave device 110B has successfully received such packet of audio stream sent from the audio gateway 105. That is, only when the master device 110A has successfully received the packet of audio stream and also has successfully received the second acknowledgement signal ACK2 of the slave device 110B, the master device 110A is arranged to send the first acknowledgement signal ACK1 to the audio gateway 105. The slave device 110B is not configured to directly acknowledge to the audio gateway 105, and is arranged to directly communicate with the master device 110A.

In practice, the master device 110A is arranged to send the acknowledgement signal ACK1 to the audio gateway 105 until receiving the acknowledgement signal ACK2 of the packet of audio stream, sent from the slave device 110B, and also receiving the same packet of audio stream. Each audio packet to be transmitted for example has a sequence number which corresponds to a sequence number of an acknowledgement signal. In one embodiment, the value of sequence number may range from 1 to N (a positive integer). For transmission of each audio packet, when the audio gateway 105 wirelessly transmits an audio packet having a particular sequence value to the air, the slave device 110B can send the acknowledgement signal ACK2 having the same sequence value to the master device 110A if the slave device 110B sniffs and successfully receives the audio packet. When the master device 110A receives the same audio packet and the acknowledgement signal ACK2 having the same sequence value, the master device 110A sends the acknowledgement signal ACK1 having the same sequence value to the audio gateway 105. Once receiving the acknowledgement signal ACK1 having the same sequence value, the audio gateway 105 can determine that such audio packet has been received by the devices 110A and 110B and is not lost.

In addition, the audio gateway 105 may trigger an expiration timer for transmission of each audio packet, and count down the expiration timer before receiving the acknowledgement signal ACK1 having a sequence value which is equal to the sequence value of an audio packet that has been transmitted. The audio gateway 105 determines that such transmitted audio packet is lost and then repeats the transmission of such lost audio packet if the expiration timer is expired. By doing so, packets of audio stream receptions of the devices 110A and 110B can be synchronized in the same time slots. The audio quality heard by users can be improved significantly.

Additionally, in a second embodiment, the acknowledgement signals may indicate negative acknowledgements. For instance, for transmission of each audio packet, when the audio gateway 105 wirelessly transmits an audio packet having a particular sequence value to the air, the slave device 110B can send a negative acknowledgement signal NACK2 having the same sequence value to the master device 110A if the slave device 110B fails to successfully receive the packet of audio stream (the slave device 110 may not correctly receive the packet or the packet is lost). When the master device 110A also fails to receive the same packet of audio stream and/or receives the negative acknowledgement signal NACK2 having the same sequence value, the master device 110A sends a negative acknowledgement signal NACK1 having the same sequence value to the audio gateway 105. Once receiving the negative acknowledgement signal NACK1 having the same sequence value, the audio gateway 105 can determine that such audio packet is not successfully received by the devices 110A and 110B and then repeats the transmission of such audio packet. By doing so, audio packet receptions of the devices 110A and 110B can be synchronized in the same time slots. The audio quality heard by users can be improved.

Additionally, in a third embodiment, the processing circuit 1102A of master device 110A can be arranged to control communication circuit 1101A to transmit a negotiation configuration packet to the slave device 110B to form a second piconet PN2 which is different from the first piconet PN1 in which the master device 110A communicates with the audio gateway 105. In addition, the processing circuit 1102B of slave device 110B is arranged to control communication circuit 1101B to send a corresponding acknowledgement packet to the master device 110A if the negotiation configuration packet has been successfully accepted by the slave device 110B. That is, the master device 110A can be arranged to communicate with the slave device 110B directly in another different piconet. If the master device 110A is transmitting the negotiation configuration packet to the slave device 110B to negotiate with the slave device 110B currently, a packet of audio stream currently transmitted by the audio gateway 105 is to be discarded by the master device 110A.

Further, based on the negotiation configuration packet and corresponding acknowledgement packet, the first transceiver 110A and second transceiver 110B, respectively used as master device and slave device, can be arranged to re-determine which one is the master device after the negotiation between first transceiver 110A and second transceiver 110B has established. For example, the first transceiver 110A, originally used as the master device, can be re-determined as the slave device, and the second transceiver 110B, originally used as the slave device, can be re-determined as the master device. That is, the roles of transceivers 110A and 110B can be exchanged based on the negotiation mentioned above.

Further, after the second piconet PN2 is established, no matter which one is used as the master device, the transceivers 110A and 110B can be arranged to exchange and/or share control information and data.

Figure 2:
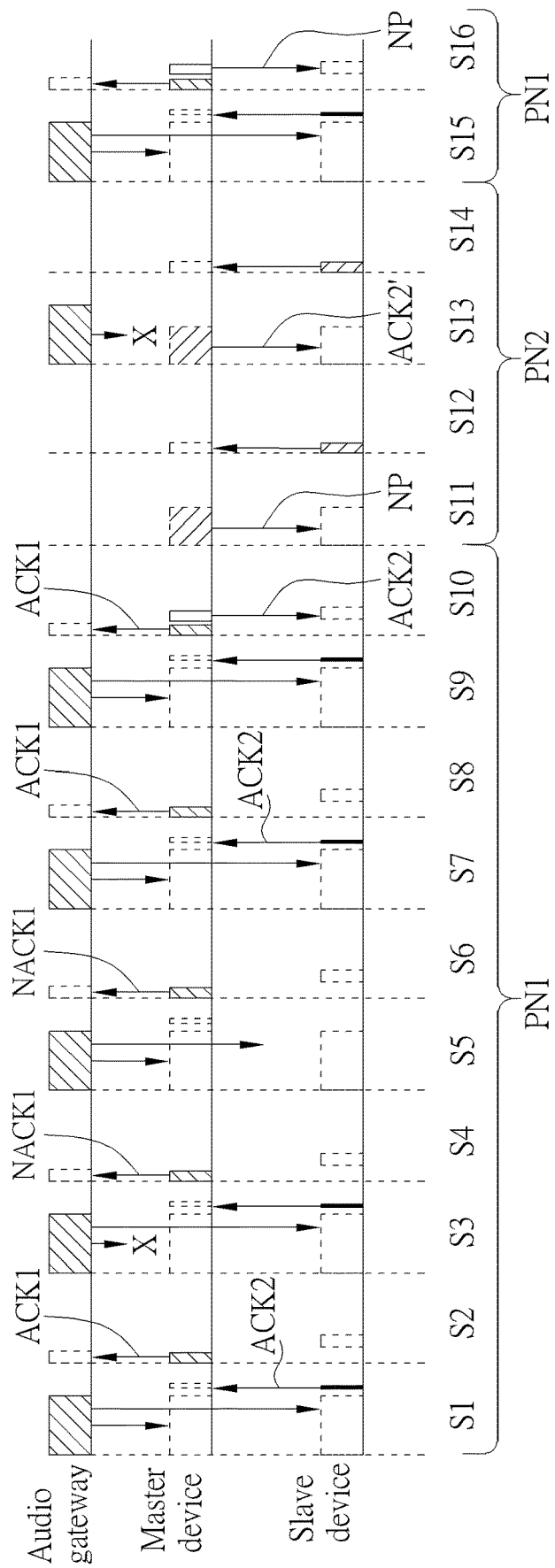
FIG. 2 is an example diagram showing traffics of audio gateway, master device, and slave device over aligned time slot boundary.

Refer to FIG. 2. FIG. 2 is an example diagram showing traffics of audio gateway 105, master device 110A, and slave device 110B over aligned time slot boundary. Piconets PN1 and PN2 have aligned Bluetooth time slot boundary. As shown in FIG. 2, in a first scenario, at time slot S1, the audio gateway 105 may wirelessly transmit a packet of audio stream to the air, and both the master device 110A and slave device 110B successfully receives such packet of audio stream at time slot S1. The slave device 110B at slot S1 is arranged to send the second acknowledge ACK2 to the slave device 110B. The master device 110A is arranged to send the first acknowledgement signal ACK1 to the audio gateway 105 at time slot S2 after successfully receiving the packet of audio stream and also receiving the second acknowledge ACK2 from the slave device 110B. Thus, the audio gateway 105 can determine that the packet of audio stream has been received by both the devices and is arranged to not re-transmit the packet.

In a second scenario, at time slot S3, the audio gateway 105 may wirelessly transmit a packet of audio stream to the air, and the slave device 110B successfully receives such packet of audio stream at time slot S3 while the master device 110A fails to receive such packet of audio stream (this packet is lost for device 110A) at time slot S3. The slave device 110B is arranged to send the second acknowledge ACK2 to the slave device 110B at time slot S3 after receiving the packet. The master device 110A is arranged to send the negative acknowledgement signal NACK1 to the audio gateway 105 at time slot S4 since the packet is not received by the device 110A. Thus, the audio gateway 105 can determine to re-transmit the packet when receiving the negative acknowledgement signal NACK1.

In a third scenario, at time slot S5, the audio gateway 105 may wirelessly transmit a packet of audio stream to the air, and the master device 110A successfully receives such packet of audio stream at time slot S5 while the slave device 110B fails to receive such packet of audio stream (this packet is lost for device 110B) at time slot S5. In this example, the slave device 110B is arranged to not send an acknowledgement signal to the master device 110A since the packet is not received. In another example, the slave device 110B may be arranged to send the negative acknowledgement signal NACK2 to the master device 110A if the packet is not received. This is not meant to be a limitation. The master device 110A may be arranged to send the negative acknowledgement signal NACK1 to the audio gateway 105 at time slot S6 since the master device 110A fails to receive any acknowledgement signal from the slave device 110B (The master device 110A can determine that the packet is lost for the device 110B). Thus, the audio gateway 105 can determine to re-transmit the packet when receiving the negative acknowledgement signal NACK1.

In a fourth scenario, at time slot S7, the audio gateway 105 may wirelessly transmit a packet of audio stream to the air, and both the master device 110A and slave device 110B successfully receives such packet of audio stream at time slot S7. The slave device 110B at time slot S7 is arranged to send the second acknowledge ACK2 to the slave device 110B. The master device 110A is arranged to send the first acknowledgement signal ACK1 to the audio gateway 105 at time slot S8 after successfully receiving the packet of audio stream and also receiving the second acknowledge ACK2 from the slave device 110B. Thus, the audio gateway 105 can determine that the packet of audio stream has been received by both the devices and is arranged to not re-transmit the packet.

In a fifth scenario, at time slot S9, the audio gateway 105 may wirelessly transmit a packet of audio stream to the air, and both the master device 110A and slave device 110B successfully receives such packet of audio stream at time slot S9. The slave device 110B is arranged to send the second acknowledge ACK2 to the master device 110A at time slot S9. The master device 110A is arranged to send the first acknowledgement signal ACK1 to the audio gateway 105 at time slot S10 after successfully receiving the packet of audio stream and also receiving the second acknowledge ACK2 from the slave device 110B. Thus, the audio gateway 105 can determine that the packet of audio stream has been received by both the devices and is arranged to not re-transmit the packet. In addition, after sending the first acknowledgement signal ACK1, at time slot S10, the master device 110A may be arranged to communicate with the slave device 110B by sending a negotiation configuration packet NP to the slave device 110B directly. For example, the master device 110A may notify the slave device 110B of transmitting data and/or control information to the slave device 110B by sending the negotiation configuration packet NP. This negotiation configuration packet NP makes the master device 110A and slave device 110B form a second piconet PN2. Then, at time slot S11, the master device 110A is arranged to transmit a data packet and/or a control packet to the slave device 110B. At time slot S12, the slave device 110B in the second piconet PN2 successfully receives the data packet and/or control packet from master device 110A and then transmits a corresponding acknowledgement packet ACK2' to the master device 110A.

At time slot S13, when the master device 110A uses the second piconet PN2 to transmit other data packet and/or control packet to the slave device 110B, a different packet of audio stream transmitted from the audio gateway 105 using the piconet PN1 is to be discarded by the master device 110A. In addition, a packet of audio stream transmitted from the audio gateway 105 using the piconet PN1 will also be discarded by master device 110A if the master device 110A is transmitting the negotiation configuration packet NP to the slave device 110B to negotiate with the slave device 110B. The slave device 110B in the second piconet PN2 successfully receives the data packet and/or control packet from master device 110A and then at time slot S14 transmits the corresponding acknowledgement packet ACK2' to the master device 110A using the second piconet PN2.

In a sixth scenario, the master device 110A and slave device 110B may end the data and control information transmission using the second piconet PN2, and then the traffic transmission is initiated by the audio gateway 105 at time slot S15. At time slot S15, the audio gateway 105 wirelessly transmits a packet of audio stream to the air, and both the master device 110A and slave device 110B successfully receives such packet of audio stream at time slot S15. The slave device 110B is arranged to send the second acknowledge ACK2 to the master device 110A at time slot S15. The master device 110A is arranged to send the first acknowledgement signal ACK1 to the audio gateway 105 at time slot S16 after successfully receiving the packet of audio stream and also receiving the second acknowledge ACK2 from the slave device 110B. Thus, the audio gateway 105 can determine that the packet of audio stream has been received by both the devices and is arranged to not re-transmit the packet. In addition, after sending the first acknowledgement signal ACK1, at time slot S16, the master device 110A may communicate with the slave device 110B by sending the negotiation configuration packet NP to the slave device 110B directly. For example, the master device 110A may send the negotiation configuration packet NP to slave device 110B to negotiate with slave device 110B which device is re-determined as a new master device. For example, the master device 110A may use the negotiation configuration packet NP to indicate that the slave device 110B is re-determined as a new master device. If the device 110B accepts or agrees this configuration, the device 110B can send transmits a corresponding acknowledgement signal to the device 110A, and the configuration is completed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless Bluetooth audio communication system, comprising:
    an audio gateway of a piconet, configured to communicate with a master device in the piconet and to transmit at least one packet of audio stream to the master device and a slave device;
    a first transceiver used as the master device, configured to receive the at least one packet of the audio stream; and
    a second transceiver used as the slave device, configured to receive the at least one packet of the audio stream transmitted from the audio gateway and configured to acknowledge to the first transceiver whether the second transceiver has successfully received the at least one packet of the audio stream;
    wherein the first transceiver is further arranged to transmit a packet having a negotiation configuration command to the second transceiver, and the second transceiver is arranged to send a corresponding acknowledgement packet to the first transceiver if the packet having the negotiation configuration command has been successfully accepted by the second transceiver; and a different packet of the audio stream is to be discarded by the first transceiver if the first transceiver is transmitting the packet having the negotiation configuration command to the second transceiver to negotiate with the second transceiver.

2. The wireless Bluetooth audio communication system of claim 1, wherein the first transceiver is arranged to send a first acknowledgement signal to the audio gateway when determining that the first transceiver has successfully received the at least one packet of the audio stream and has successfully received a second acknowledgement signal sent from the second transceiver.

3. The wireless Bluetooth audio communication system of claim 1, wherein the first transceiver is arranged to send a negative acknowledgement signal to the audio gateway when determining that the at least one packet of the audio stream is not successfully received by the first transceiver or the second transceiver fails to successfully receive the at least one packet of the audio stream from the audio gateway.

4. The wireless Bluetooth audio communication system of claim 1, wherein the first transceiver and the second transceiver are capable of re-determining which one is the master device after a negotiation between the first transceiver and the second transceiver has established.

5. The wireless Bluetooth audio communication system of claim 1, wherein the first transceiver and the second transceiver are arranged to share and exchange control information and data.

6. A transceiver of a wireless Bluetooth audio communication system in which an audio gateway of a piconet is arranged to communicate with a master device in the piconet and to transmit at least one packet of audio stream to the master device and a slave device, the transceiver being used as the master device and comprising:

a communication circuit, configured to receive the at least one packet of the audio stream from the audio gateway; and a processing circuit, coupled to the communication circuit, configured to control the communication circuit to acknowledge to the audio gateway whether the transceiver has successfully received the at least one packet of the audio stream and the slave device has successfully received the at least one packet of the audio stream from the audio gateway;

wherein the transceiver is further arranged to transmit a packet having a negotiation configuration command to the slave device; and, a different packet of the audio stream from the audio gateway is to be discarded by the transceiver if the transceiver is transmitting the packet having the negotiation configuration command to the slave device to negotiate with the slave device.

7. The transceiver of claim 6, wherein the transceiver is arranged to send an acknowledgement signal to the audio gateway when determining that the at least one packet of the audio stream is successfully received by the transceiver and also the slave device has successfully received the at least one packet of the audio stream from the audio gateway.

8. The transceiver of claim 6, wherein the transceiver is arranged to send a negative acknowledgement signal to the audio gateway when determining that the at least one packet of the audio stream is not successfully received by the transceiver or the slave device fails to successfully receive the at least one packet of the audio stream from the audio gateway.

9. The transceiver of claim 6, wherein the transceiver and the slave device are capable of re-determining which one is the master device after a negotiation between the transceiver and the slave device has established.

10. The transceiver of claim 6, wherein the transceiver and the slave device are arranged to share or exchange control information and data.

* * * * *